United States Patent [19]
Michelet et al.

[11] 3,838,329
[45] Sept. 24, 1974

[54] POWER SUPPLY CIRCUIT

[75] Inventors: Robert Wilson Michelet, Madison; Stephen Vincent Natale, New Providence; David Edward Phillips, Hawthorne, all of N.J.

[73] Assignee: Bell Telephone Laboratories, Incorporated, Murray Hill, N.J.

[22] Filed: May 21, 1973

[21] Appl. No.: 362,400

[52] U.S. Cl................. 321/2, 307/240, 323/17, 323/22 T, 323/DIG. 1
[51] Int. Cl............................................. H02m 3/32
[58] Field of Search........ 307/240, 243, 246, 247 R, 307/253, 297; 321/2; 323/17, 22 T, DIG. 1

[56] References Cited
UNITED STATES PATENTS

| | | | |
|---|---|---|---|
| 3,130,327 | 4/1964 | Krossa et al. | 307/253 |
| 3,500,127 | 3/1970 | Schiff | 323/DIG. 1 |
| 3,559,040 | 1/1971 | Fickenscher | 323/DIG. 1 |

*Primary Examiner*—A. D. Pellinen
*Attorney, Agent, or Firm*—M. J. Urbano

[57] ABSTRACT

In a power supply circuit, such as a converter or a switching regulator, forward and reverse drive current is alternately applied to the base of a power switching transistor by a base drive circuit which alternately drives the power transistor into and out of saturation. The forward drive current flows through a current switch and then a capacitor which is connected in series with the base of the power transistor. The forward drive current charges the capacitor and at the same time saturates the power transistor. In order to cut off the power transistor, and to reduce charge storage effects therein, a reverse drive current path is also provided which includes the capacitor, a second switch which, in one embodiment, controls the current switch, and a pair of diodes which bypass the power transistor and the current switch during the flow of reverse current. As long as the power transistor has excess charge stored in its base region, its emitter-base junction behaves as if it were forward biased and the reverse current will flow through the emitter-base junction of the power transistor. However, once the excess charge in the power transistor is depleted, its base-emitter junction becomes reverse biased and the discharge path is closed instead through the diodes. In another embodiment, the second switch located in the reverse drive path is controlled by the current switch located in the forward drive path rather than conversely.

23 Claims, 3 Drawing Figures

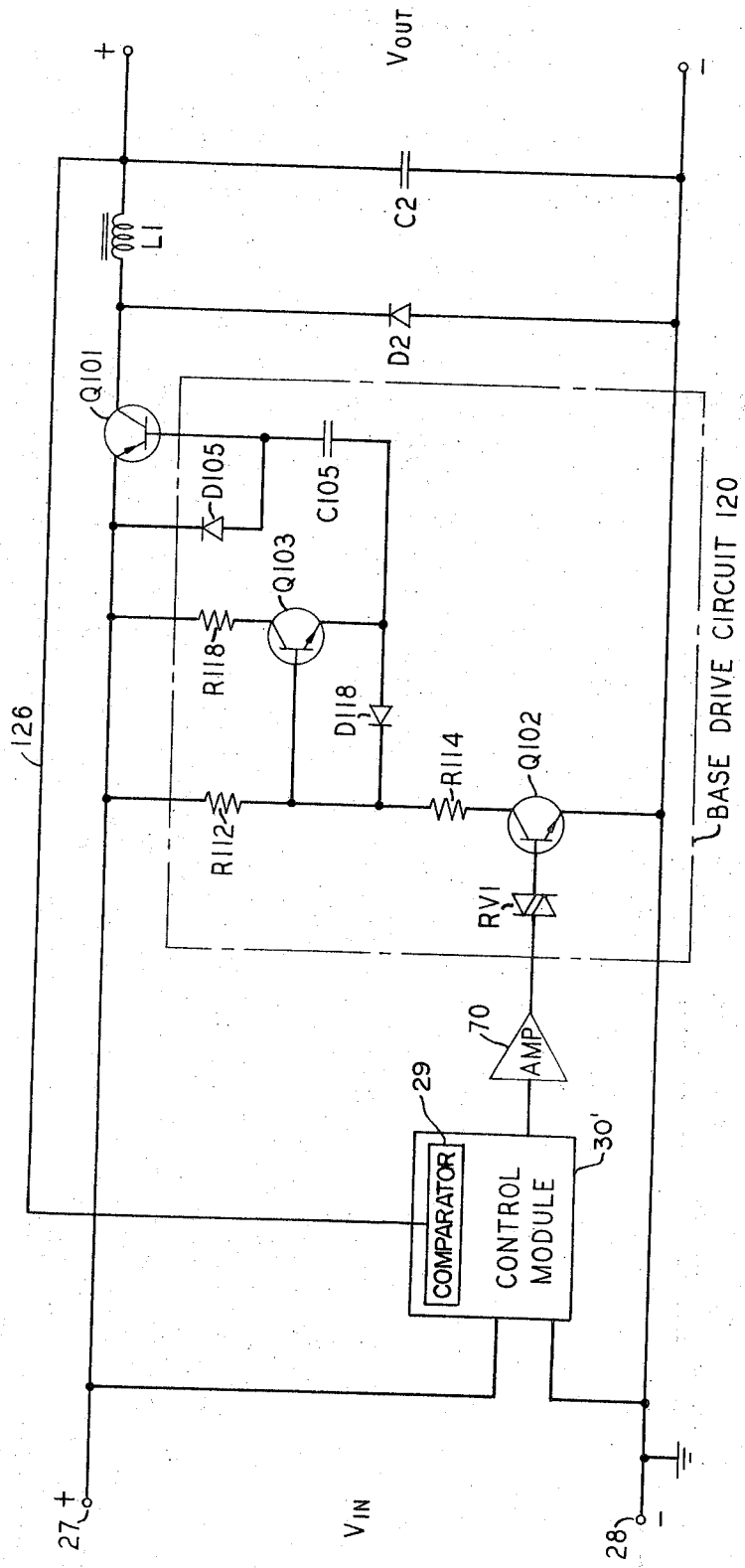
F/G. 3

POWER SUPPLY CIRCUIT

BACKGROUND OF THE INVENTION

This invention relates to power supply circuits, and more particularly, to base drive circuits for power switching transistors used in converter and regulator circuits, for example.

In a typical DC-to-DC converter circuit a DC signal is alternately applied between the center tap and opposite ends of one winding of a transformer by means of a pair of power switching transistors connected in common emitter configurations. The state of each of these transistors is controlled by a base drive circuit connected in turn to a control module. The drive circuits alternately saturate and cut off the power transistors, thereby switching the input signal from one side of the transformer to the other. One problem with such power converter circuits is relatively long storage times caused by excessive charge stored in the base region of the power transistor during saturation. This problem is particularly severe during relatively high frequency operation (e.g., about 20 kHz). A similar problem exists in other power supply circuits such as switching regulators.

A general solution suggested by the prior art to reduce storage times of power switching transistors in such circuits is to apply a reverse drive current to the base-emitter junction of the saturated power transistor. Unfortunately, an effective circuit for supplying such forward drive current of magnitude substantially independent of the magnitude of the reverse drive current, and so that the power transistor closely follows control signals applied to the drive circuit, has not been available.

SUMMARY OF THE INVENTION

In accordance with one aspect of our invention, reverse drive current is supplied to the base of a power switching transistor to reduce significantly the storage time of the power transistor, and to cause the power transistor to closely follow control signals. The magnitude of the reverse drive current is substantially independent of the magnitude of the forward drive current used to saturate the power transistor, thereby providing in a single circuit configuration flexibility of design as to a relatively wide range of values of forward and reverse drive currents.

Our base drive circuit illustratively comprises a first current path for supplying forward drive current to the base of a power transistor which is connected in a common emitter configuration. The forward drive current flows through a current limiting resistor, a current switch and then a capacitor, which is connected in series with the base of the power transistor. The forward drive current charges the capacitor and at the same time saturates the power transistor. In order to cut off the power transistor and to reduce charge storage effects therein, a reverse drive current path is also provided which includes the capacitor, another current limiting resistor, a second switch which controls the current switch, and a pair of asymmetrically conducting means which bypass the power transistors and the current switch during the flow of reverse current. As long as the power transistor has excess charge stored in its base region, its emitter-base junction behaves as if it were forward biased and the reverse current flows through the emitter-base junction of the power transistor. However, once the excess charge in the power transistor is depleted by driving reverse current through its emitter-base junction, its base-emitter junction becomes reverse biased and the discharge path is closed instead through the asymmetrically conducting means.

In another embodiment of our invention, the second switch located in the reverse path is controlled by the current switch located in the forward path rather than conversely.

Other advantageous aspects of our base drive circuit are: its ability to provide current gain of approximately 10:1 to 25:1 depending on the particular transistors used; and its ability to reduce not only the absolute magnitude of storage time of a power transistor but also the difference between the storage times of a pair of such transistors used in a DC-to-DC converter. As described more fully hereinafter, the latter is important for reducing the likelihood of saturating the power transformer of such converters and causing secondary breakdown in the transistors.

BRIEF DESCRIPTION OF THE DRAWING

Our invention in all its aspects, together with its various features and advantages, can be easily understood from the following more detailed description taken in conjunction with the accompanying drawing in which:

FIG. 3 is a schematic of a switching regulator employing yet another illustrative embodiment of our base drive circuit.

DETAILED DESCRIPTION

Figure 1:
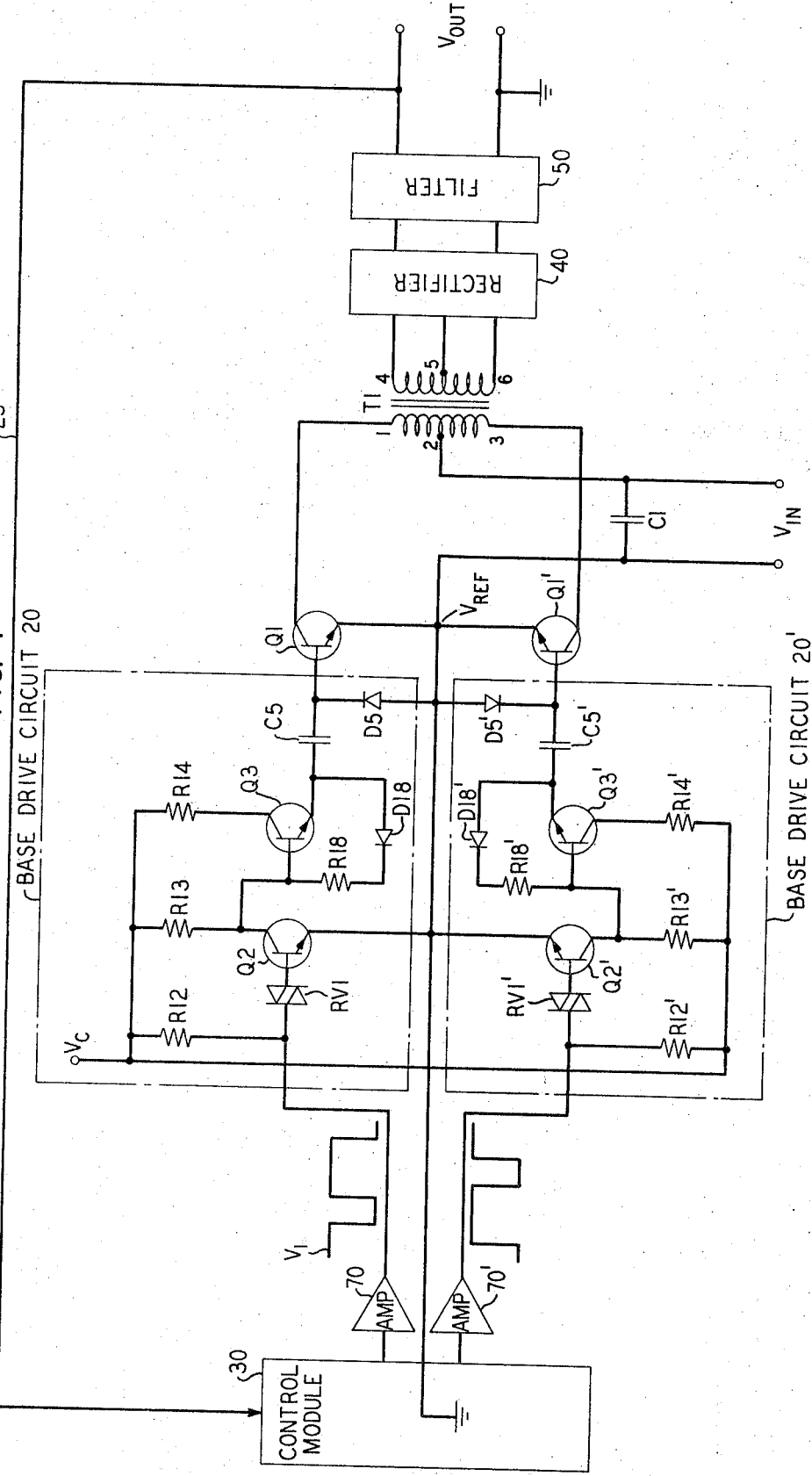
FIG. 1 is a schematic of a DC-to-DC converter employing an illustrative embodiment of our base drive circuit.

Turning now to FIG. 1, there is shown a power supply circuit which functions as a DC-to-DC converter. AC inputs can also be accommodated by using a suitable rectifier (not shown) between the input and capacitor C1. The DC voltage across capacitor C1 is applied between the center tap 2 of transformer T1 and to the emitters of power switching transistors Q1 and Q1' which have their respective collectors connected to opposite ends 1 and 3 of the primary winding of transformer T1. Power switching transistors Q1 and Q1' are alternately driven into and out of saturation by appropriate signals applied to their respective bases by drive circuits 20 and 20' which in turn are controlled by the depicted pulse waveforms generated by a control module 30. Optionally, amplifiers 70 and 70' are provided between the control module 30 and the drive circuits 20 and 20' respectively, in order to amplify the control pulses.

In order that the DC voltage appearing across capacitor C1 may be converted to a different level, this voltage is applied to the primary of transformer T1 in an AC fashion; that is, the DC voltage to be converted is alternately applied between primary windings 1–2 and 2–3 by alternately saturating, respectively, power switching transistors Q1 and Q1'. The voltage applied to the primary of transformer T1 may be either stepped down or stepped up as desired by a suitable choice of transformer T1. The resulting voltage, which appears across secondary windings 4–5 and 5–6 of T1, is then rectified by rectifier 40 and filtered by an averaging filter 50, all of which are well known circuits in the art, to produce a DC output $V_{out}$ of the desired level. The output is fed back over lead 25 to control module 30 in order to provide regulation. That is, as the output voltage $V_{out}$ changes, the control mode adjusts its on-time (low level state) to maintain constant the volt-time product of the square waves across the windings 1–2 and 2–3 of T1.

One of the problems in such converter circuits relates to the relative inability of the saturated power switching transistors Q1 and Q1' to follow closely the waveforms generated by control module 30. Another problem with such converter circuits relates to secondary breakdown of the power transistors caused by saturation of transformer T1. Saturation can result if the saturation times of Q1 and Q1' are sufficiently disparate that the volt-time products of the square waves applied to windings 1–2 and 2–3 are also so disparate that a significant net DC voltage appears across winding 1–2 or 2–3. This problem is alleviated by applying reverse drive current of appropriate magnitude effective to reduce the difference between the saturation times of Q1 and Q1'. Both of these problems are primarily due to excessive stored charge which accumulates in the base region of the saturated transistors. Consequently, it is important that this excess charge be rapidly removed from the base of the saturated power switching transistors.

Accordingly, a base drive circuit 20 (FIG. 1) in accordance with an illustrative embodiment of our invention, comprises with respect to power switching transistor Q1, first asymmetrically conducting means, diode D5, connected between the base and emitter of npn transistor Q1 and oppositely poled to its base-emitter junction. An npn transistor Q3 has its collector connected through a current limiting resistor R14 to a source of voltage $V_c$ and has its emitter connected through charge storage means, capacitor C5, to the base of Q1. The series combination of a current limiting resistor R18 and second asymmetrically conducting means, diode D18, is connected between the base and emitter of Q3, with the diode D18 being oppositely poled to the base-emitter junction of Q3. A third npn transistor Q2 has its collector connected through a bias resistor R13 to the voltage source $V_c$ and, in addition, has its collector connected to the base of Q3. The emitter of Q2 is connected to the same source of reference potential $V_{ref}$ as the emitter of Q1. The base of Q2 is connected through a varistor RV1 and an amplifier 70 to the control module 30, and the side of the varistor RV1 remote from the base of Q1 is connected through a bias resistor R12 to the voltage source $V_c$.

As shown in FIG. 1, the converter has two symmetrical base drive circuits 20 and 20', one of which is used to drive transistor Q1 and the other of which drives transistor Q1'. The components of the portion of the base drive circuit used to drive transistor Q1' have been given identical indicia with the addition only of prime notation. The following description of the circuit operation of the base drive circuit 20 with respect to power switching transistor Q1 applies equally as well to the base drive circuit 20' used to drive power switching transistor Q1'.

For the purposes of the following description we shall define certain current paths which function to apply forward drive current, and alternately reverse drive current, to the emitter-base junction of power switching transistor Q1. A first current path means, the drive current path, extends between $V_c$ and $V_{ref}$ and includes current limiting resistor R14, transistor Q3, capacitor C5 and power switching transistor Q1. A second current path means, the reverse drive path, comprises a loop formed by power switching transistor Q1, capacitor C5, diode D18, current limiting resistor R18, and transistor Q2. During the first part of the reverse drive cycle the reverse drive path includes the base-emitter junction of Q1, whereas during the latter part of the reverse drive cycle the reverse drive path includes instead the diode D5. It should be noted that diode D5 performs two functions: (1) it limits the reverse voltage appearing across the base-emitter junction of transistor Q1 in order to prevent pinch-in effects which might permanently damage the transistor, and (2) it guarantees a discharge path for capacitor C5 when he base-emitter junction of transistor Q1 is reverse biased.

More specifically, the operation of our base drive circuit is as follows: when the input signal from control module 30 is at a relatively low level, illustratively shown to be 0 volts, current from source $V_c$ flows through R12 into module 30. Thus, the base of transistor Q2 is virtually at zero potential which places transistor Q2 in the cut-off mode.

In this regard, varistor RV1 is an optional component depending on the voltage seen by the base of transistor Q2 when control module 30 is in the low level state. If the low level voltage seen by the base of transistor Q2 approaches a voltage capable of turning on the transistor Q2, then RV1 is used to prevent the flow of current into the base of Q2 and hence keeps Q2 cut off. In addition, RV1 permits current to flow out of the base of Q2 to $V_{ref}$ in order to turn off Q2 when the control voltage switches to the low level state.

With Q2 in the cut-off mode, current from source $V_c$ now flows through resistor R13 and the base-emitter junction of transistor Q3. This current saturates transistor Q3 and permits current to flow from source $V_c$ through resistor R14, transistor Q3 and capacitor C5 to the base of power switching transistor Q1. The circuit components, particularly R14 and C5, are selected so that transistor Q1 is saturated by this forward drive current. In addition, the forward drive current causes charge to accumulate on capacitor C5 resulting in the buildup of a voltage across the capacitor which is negative on the side connected to transistor Q1 and positive on the side connected to transistor Q3.

To accomplish turn off of transistor Q1, the voltage signal from control module 30 swings from zero to some positive level $V_1$ causing the current that was flowing in resistor R12 to change its path from module 30 to the base of transistor Q2, causing transistor Q2 to saturate. When transistor Q2 saturates, the base of transistor Q3 is brought virtually to $V_{ref}$, typically ground potential. Transistor Q3 is thereby placed in the nonconducting mode which opens the forward drive path from source $V_c$ and prevents forward drive current from being applied to the base of power switching transistor Q1.

At this point it is assumed that excess charge has accumulated in the base of power switching transistor Q1 so that its base-emitter junction behaves as if it were forward biased (thus diode D5 is reverse biased). Capacitor C5 now acts as a source of reverse drive current and discharges through the second current path means; that is, through diode D18, current limiting resistor R18, saturated transistor Q2 and the base-emitter junction of power switching transistor Q1. Note, that when transistor Q3 is turned off, its base-emitter junction becomes reverse biased and diode D18 is forward biased. Thus, diode D18 and resistor R18 effectively bypass transistor Q3, permitting the reverse drive current to complete its path to saturated transistor Q2, thereby discharging capacitor C5.

In addition, it should also be noted that the base-emitter junction of power switching transistor Q1 maintains a forward bias voltage only as long as excess charge remains in its base. When the reverse drive current has removed this charge, the base emitter junction of Q1 becomes reverse biased so that the reverse drive current path would be interrupted were it not for the presence of diode D5; that is, when the excess charge is removed from the base of power switching transistor Q1, diode D5 conducts so that the reverse drive current path is completed through D5 instead of through Q1. The forward voltage drop across diode D5 provides a reverse bias across the base-emitter junction of transistor Q1 holding the latter in the off state until the control voltage from module 30 returns to its low level state.

In some cases, when large reverse drive currents are desired, the resistor R18 may be removed without hampering circuit operation.

In summary, it is apparent from the foregoing that transistor Q3 serves as a current switch or gate in the forward drive path; that is, it alternately opens and closes the forward drive path from source $V_c$ to the base of power transistor Q1. This current switch is responsive to a second switch (transistor Q2) connected in the reverse drive path. Since transistors Q2 and Q3 are connected in cascade, the current switch Q2 and the second switch Q3 are 180° out of phase with one another. Therefore, in the path portion common to both the forward and reverse drive paths (i.e., in capacitor C5) the direction of current flow reverses whenever control module 30 changes state. In addition, the reverse drive current path is first closed through the base-emitter junction of power transistor Q1 as long as excess charge remains in the base of Q1, but is later closed through diode D5 when that excess charge is removed.

In the design of our base drive circuit we have found that it is desirable that the voltage across capacitor C5 be much less than the voltage supplied by source $V_c$ so that the forward drive current is relatively constant. On the other hand, the voltage across capacitor C5 should be relatively large with respect to the voltage drop across diode D18 plus the saturation voltage of transistor Q2 in order to provide a large reverse drive current. Typically, the reverse drive current is 2 to 3 times larger than the forward drive current depending on the values of resistors R14, R18 and capacitor C5.

In an illustrative embodiment of the converter circuit shown in FIG. 1, the input voltage $V_{in}$ ranges between 120 and 160 volts DC. For these input voltages the resulting outputs are ±6 volts DC for loads of 3.5 to 5.5 amperes. The following component values are suitable to achieve the foregoing operating conditions:

| | |
|---|---|
| R12 | 1000 ohms |
| R13 | 3010 ohms |
| R14 | 147 ohms |
| R18 | zero ohms |
| C5 | 0.681 µf |
| D18, D5 | power—400 mw; forward current—1.0 a (max); forward voltage—1.2 v (max); reverse recovery time—50 ns (max); all at 25°C |
| RV1 | forward and reverse voltages 0.5 v at 10 ma at 25° C |
| Q1 | $V_{ce}$ sustain voltage—325 v; commercially available from Motorola Corporation under code No. MJ 423 |
| Q2, Q3 | switching current—up to 1.35 a; turn-on time—150 ns (max); turn-off time—350 ns (max); all at 25° C |
| T1 | ferrite pot core; peak primary winding current—1.0 a |
| I (forward drive) | 100 ma |
| I (reverse drive) | 400 ma |
| $V_c$ | 15.8 v |
| $V_{ref}$ | ground |
| $V_1$ | voltage drop across RV1 and the base-emitter junction of Q2 |

The foregoing parameter values are supplied for the purposes of illustration only and are not to be construed as limitations on the scope of the invention.

Figure 2:
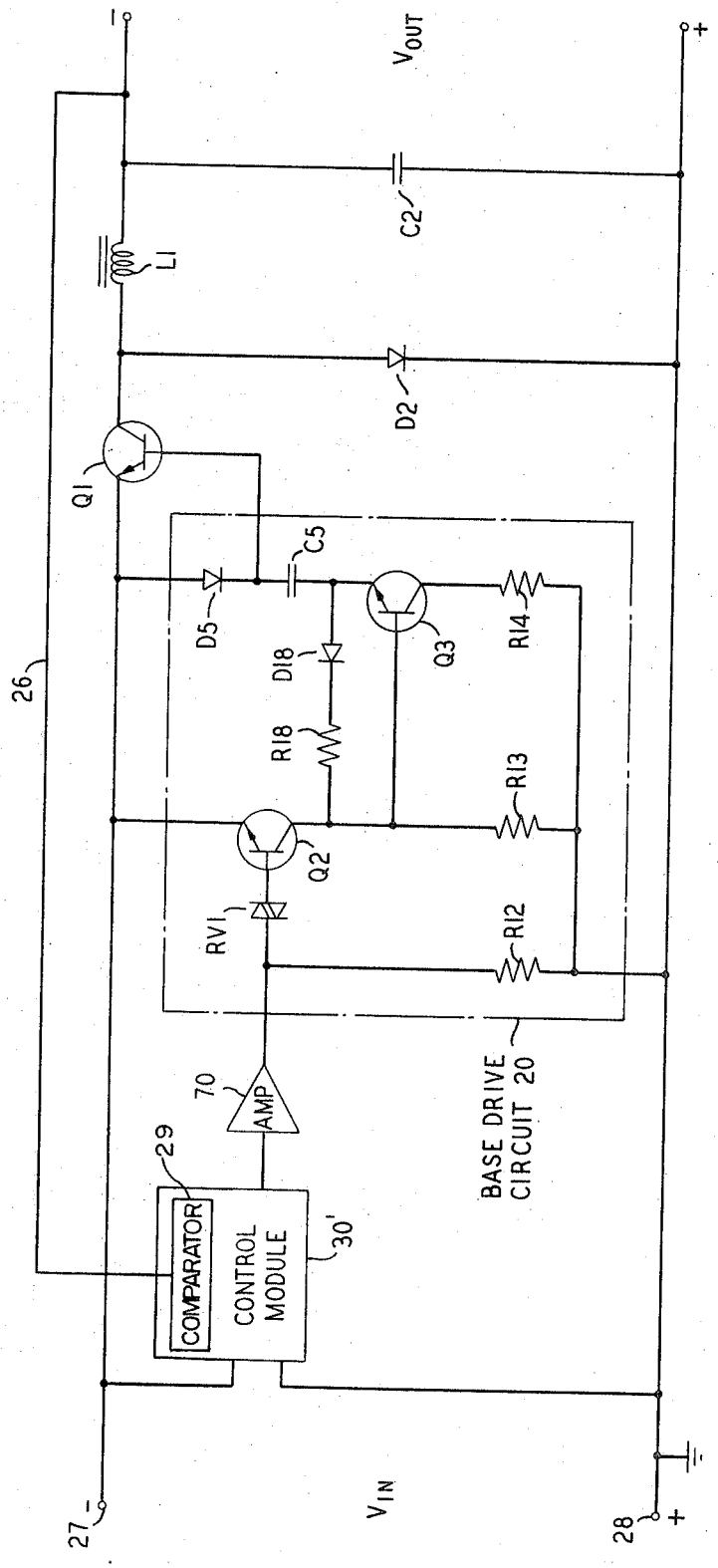
FIG. 2 is a schematic of a switching regulator employing an illustrative embodiment of our base drive circuit.

In an alternative embodiment of our invention shown in FIG. 2, our base drive circuit 20 is utilized to drive a power switching transistor Q1 as part of a switching regulator for regulating negative inputs. In this type of circuit an input voltage $V_{in}$ to be regulated is applied across terminals 27 and 28 to which a control module 30' is also connected. The control signals generated by the module 30' are optionally amplified by an amplifier 70 and applied to the base drive circuit 20. In addition, the control module 30' includes a well known difference amplifier or other suitable comparator 2a for comparing a reference voltage (in the module) and the output voltage sensed on lead 26.

Power switching transistor Q1 is connected in series between the negative side of the input and the negative side of the output. In addition, a flyback diode D2 is connected between the collector of Q1 and ground. When Q1 is saturated, the input voltage is applied across D2 and an averaging filter. The latter comprises inductor L1 connected between the collector of Q1 and the negative side of the output and capacitor C2 connected across the output. Of course, the manner of adapting such a regulator to receive positive signals is well known to those skilled in the art.

Inasmuch as the operation of the switching regulator is also well known to those skilled in the art, only a brief description follows, it being understood that the function of our base drive circuit in the switching regulator is substantially identical to that previously described with respect to the converter of FIG. 1. More specifically, the control module 30' is adapted to maintain constant the volt-time product of a fixed repetition rate (e.g., 20 kHz) square wave appearing across D2. Since the repetition rate of the square wave is fixed, its average value is constant. Thus, the averaging filter comprising inductor L1 and capacitor C2 is used to derive a constant DC output.

It is to be understood that the above-described arrangements are merely illustrative of the any possible specific embodiments which can be devised to represent application of the principles of the invention. Numerous and varied other arrangements can be devised in accordance with these principles by those skilled in the art without departing from the spirit and scope of the invention.

In particular, another embodiment of our invention is shown in FIG. 3 which depicts a switching regulator analogous to that shown in FIG. 2 but adapted to regulate positive input signals. In FIG. 3, however, the base drive circuit has been modified so that the forward drive current path includes the base-emitter junction of saturated transistor Q101, capacitor C105, diode D18, current limiting resistor R114 and first switch means, transistor Q102. When Q102 is turned off by a control signal from module 30', second switch means is closed (i.e., transistor Q103 is saturated) and capacitor C105 discharges in a second current path which includes initially the base-emitter junction of Q101 (until excess charge stored in its base is removed) then diode D105, current limiting resistor R118 and transistor Q103. Note that D105 bypasses Q101 during the flow of reverse drive current whereas D118 bypasses Q103 during the flow of forward drive current. In contrast with the embodiments of FIGS. 1 and 2, in the circuit of FIG. 3, diode D118 is in the forward drive path and transistor Q103 is in the reverse drive path, rather than conversely. Moreover, the switch means in the forward path (transistor 102) controls the switch means in the reverse path (transistor 103) rather than conversely. Otherwise, the operation of the circuit closely resembles that of FIGS. 1 and 2.

What is claimed is:

1. A circuit for alternately applying forward and reverse drive current to the base of a power switching transistor to alternately drive said power transistor into and out of saturation, comprising:

first current path means for applying forward drive current to the base of said transistor, said first current path means including first switch means capable of interrupting the flow of said forward drive current and charge storage means connected between said first switch means and the base of said power transistor for accumulating charge during the flow of said forward drive current;

second current path means for applying reverse drive current to the base of said transistor including second switch means responsive to control signals for opening and closing said first switch means, said second current path means having a path segment common with at least that part of said first current path means which includes said charge storage means, and first means for bypassing said first switch means and second means for bypassing said power transistor during the flow of said reverse drive current.

2. The circuit of claim 1 wherein said path segment includes also said first switch means.

3. The circuit of claim 2 wherein said first bypassing means comprises first asymmetrically conducting means in parallel with said first switch means for connecting said second switch means to said charge storage means during the flow of said reverse drive current, and said second bypassing means comprises second asymmetrically conducting means in parallel with the base-emitter junction of said power transistor for bypassing said junction when said junction is reverse biased.

4. The circuit of claim 3 wherein said first switch means comprises a first transistor and first current limiting resistor for controlling the magnitude of the forward current, said first resistor having one end thereof connected to the collector of said first transistor and the other end thereof being connectable to a first voltage source, and the emitter of said first transistor being connected to said charge storage means.

5. The circuit of claim 4 wherein said first asymmetrically conducting means comprises a first diode connected in parallel with the base-emitter junction of said first transistor and oppositely poled thereto.

6. The circuit of claim 5 including a second current limiting resistor in series with said first diode for controlling the magnitude of the reverse current.

7. The circuit of claim 3 wherein said second asymmetrically conducting means comprises a second diode connected in parallel with the base-emitter junction of said power transistor and oppositely poled thereto.

8. The circuit of claim 4 wherein said second switch means comprises a second transistor having: its base and collector connectable to said first voltage source, its collector connected to the base of said first transistor, its emitter connected to a second source of reference potential, and its base connectable to a source of control signals.

9. The circuit of claim 8 including a varistor connected in series with the base of said second transistor.

10. The circuit of claim 3 wherein said charge storage means comprises a capacitor effective, in response to a first control signal applied to said second switch means, to accumulate charge during the flow of forward drive current in said first current path means and effective, in response to a second control signal applied to said second switch means, to produce reverse drive current in said second path means to remove excess charge from the base of said power switching transistor.

11. A voltage converter circuit comprising:

a transformer including a primary winding having a center tap, a pair of power switching transistors having their respective collector electrodes connected to opposite ends of said primary winding and having their emitter electrodes connected to one another, said signal to be converted being applied between the emitters of said power switching transistors and said center tap, a pair of drive circuits for alternately applying forward and reverse drive current to the base of said power switching transistors to alternately drive said power transistors into and out of saturation, each of said circuits comprising:

first current path means for applying forward drive current to the base of one of said power transistors, said first current path means including first switch means capable of interrupting the flow of said forward drive current and charge storage means connected between said first switch means and the base of said one power transistor for accumulating charge during the flow of said forward drive current;

second current path means for applying reverse drive current to the base of said one power transistor including second switch means responsive to control signals for opening and closing said first switch means, said second current path means having a path segment common with at least that part of said first current path means which includes said charge storage means; and first means for bypassing said first switch means and second means for bypassing said one power transistor during the flow of said reverse drive current;

one of said drive circuits being connected to the base of one of said power switching transistors and the other of said drive circuits being connected to the base of the other of said power switching transistors, and signal means for applying control signals alternately to said pair of drive circuits effective to alternately saturate said power switching transistors, thereby to apply said signal to be converted alternately between the center tap and opposite ends of said primary winding.

12. The converter circuit of claim 11 wherein said transformer includes a secondary winding coupled to said primary winding, a rectifier connected across said secondary winding and a filter connected to the output of said rectifier, the output of said filter being the converted output of said converter circuit.

13. A switching regulator having first and second input terminals and first and second output terminals comprising:
  a power switching transistor having its emitter and collector connected in series between said first input terminal and said first output terminal,
  a drive circuit for alternately applying forward and reverse drive current to the base of said power switching transistor to alternately drive said power transistor into and out of saturation, comprising:
    first current path means for applying forward drive current to the base of said power transistor, said first current path means including first switch means capable of interrupting the flow of said forward drive current and charge storage means connected between said first switch means and the base of said power transistor for accumulating charge during the flow of said forward drive current;
    second current path means for applying reverse drive current to the base of said power transistor including second switch means responsive to control signals for opening and closing said first switch means, said second current path means having a path segment common with at least that part of said first current path means which includes said charge storage means; and
    first means for bypassing said first switch means and second means for bypassing said power transistor during the flow of said reverse drive current;
  a control module, including comparator means, connected across said first and second input terminals, means connecting at least one of said output terminals to said comparator means, said control module having its input connected to the input of said drive circuit,
  a diode connected between the collector of said power switching transistor and a source of reference potential, and
  filter means connected in parallel with said diode.

14. The regulator of claim 13 wherein said diode is poled so that its cathode is connected to the more positive of said output terminals.

15. The regulator of claim 14 wherein said filter means comprises an inductor connected between the collector of said power switching transistor and said first output terminal and a capacitor connected in parallel with said output terminals.

16. The regulator of claim 15 wherein: said control module generates, in response to signals appearing on said connecting means, a pulsed waveform having a variable on-time and a substantially constant repetition rate, said drive circuit is effective to drive said power switching transistor in a pulse width modulated mode in response to said waveform, and said filter comprises an averaging filter.

17. The regulator of claim 16 including an amplifier connected between the output of said control module and the input of said drive circuit.

18. A circuit for alternately applying forward and reverse drive current to the base of a power switching transistor to alternately drive said power transistor into and out of saturation, comprising:
  first current path means for applying forward drive current to the base of said transistor, said first current path means including first switch means capable of interrupting the flow of said forward drive current and charge storage means connected between said first switch means and the base of said power transistor for accumulating charge during the flow of said forward drive current;
  second current path means for applying reverse drive current to the base of said transistor including second switch means responsive to said first switch means, said second current path means having a path segment common with at least that part of said first current path means which includes said charge storage means, and first bypassing means for bypassing said power transistor during the flow of said reverse drive current; and
  second bypassing means located in said first current path for bypassing said second switching means during the flow of forward drive current.

19. The circuit of claim 18 wherein said first bypassing means comprises first asymmetrically conducting means in parallel with the base-emitter junction of said power transistor for bypassing said junction when said junction is reverse biased.

20. The circuit of claim 19 wherein said second bypassing means includes a second asymmetrically conducting means located in said first current path and in parallel with said second switch means.

21. The circuit of claim 20 wherein said second asymmetrically conducting means comprises a diode and said first switch means comprises a first transistor and a resistor connected between the collector of said first transistor and one side of said diode, said second switch means comprises a second resistor and a second transistor having its base connected to said one side of said diode and its emitter connected both to the other side of said diode and to said charge storage means, said second resistor being connected between the collector of said second transistor and the emitter of said power transistor.

22. A circuit comprising:
  an input terminal and an output terminal,
  first and second terminals connectable to different sources of reference potential,
  first, second, third, and fourth resistors,
  first and second diodes, a varistor,
a capacitor,
a first transistor having emitter, collector and base electrodes,
a second transistor having emitter, collector and base electrodes,
said first resistor being connected between said first terminal and said input terminal,
said varistor being connected between said input terminal and said base electrode of said first transistor,
said second resistor being connected between said first terminal and said collector electrode of said first transistor,
said emitter electrode of said first transistor being connected to said second terminal,
said third resistor being connected between said first terminal and said collector electrode of said second transistor,
said base electrode of said second transistor being connected to said collector electrode of said first transistor,
said first diode being connected in series with said fourth resistor, and
the series combination of said first diode and said fourth resistor being connected between the base and emitter electrodes of said second transistor so that said first diode is oppositely poled to the base-emitter junction of said second transistor,
said capacitor being connected between said emitter electrode of said second transistor and said output terminal, and
said second diode being connected between said output terminal and said second terminal so that the cathode of said diode is connected to the one of said latter terminals having the higher potential.

23. A circuit comprising:
input and output terminals,
first and second terminals connectable to different sources of reference potential,
first, second, and third resistors,
first and second diodes,
a varistor,
a capacitor,
a first transistor having emitter, collector and base electrodes,
a second transistor having emitter, collector and base electrodes,
said varistor being connected between said input terminal and said base electrode of said first transistor,
said emitter electrode of said first transistor being connected to said second terminal,
said first resistor being connected between said collector electrode of said first transistor and said base electrode of said second transistor,
said second resistor being connected between said first terminal and said base electrode of said second transistor,
said third resistor being connected between said first terminal and said collector electrode of said second transistor,
said first diode being connected between said base and emitter electrodes of said second transistor so that said diode is oppositely poled to the base-emitter junction of said second transistor,
said capacitor being connected between said emitter electrode of said second transistor and said output terminal, and
said second diode being connected between said output terminal and said first terminal so that the cathode of said second diode is connected to the one of said latter two terminals having the higher potential.

* * * * *

UNITED STATES PATENT OFFICE
CERTIFICATE OF CORRECTION

Patent No. 3,838,329          Dated September 24, 1974

Inventor(s) Robert W. Michelet, Stephen V. Natale, and David E. Phillips

It is certified that error appears in the above-identified patent and that said Letters Patent are hereby corrected as shown below:

Column 6, line 36, change "2a" to --29--.

Column 6, line 65, change "any" to --many--.

Column 7, line 10, change "D18" to --D118--.

Signed and sealed this 7th day of January 1975.

(SEAL)
Attest:

McCOY M. GIBSON JR.
Attesting Officer

C. MARSHALL DANN
Commissioner of Patents